United States Patent
Kismir et al.

(10) Patent No.: US 8,991,855 B2
(45) Date of Patent: Mar. 31, 2015

(54) FABRIC FOR USE IN THE MANUFACTURE OF AN INFLATABLE AIR-BAG

(75) Inventors: Altay Kismir, Windsor (CA); David Stow, Gothenburg (SE); Gary Wootton, Staffordshire (GB); Hugh Finn, Warrington (GB); Ralf Koehnen, Cheshire (GB)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 14/005,013

(22) PCT Filed: Mar. 9, 2012

(86) PCT No.: PCT/EP2012/054140
§ 371 (c)(1),
(2), (4) Date: Sep. 26, 2013

(87) PCT Pub. No.: WO2012/123369
PCT Pub. Date: Sep. 20, 2012

(65) Prior Publication Data
US 2014/0021700 A1    Jan. 23, 2014

(30) Foreign Application Priority Data
Mar. 16, 2011 (EP) .................. 11158547

(51) Int. Cl.
*B60R 21/235* (2006.01)
*D03D 1/02* (2006.01)
(Continued)

(52) U.S. Cl.
CPC ............. *B60R 21/235* (2013.01); *D03D 1/02* (2013.01); *D03D 15/10* (2013.01); *D02G 3/36* (2013.01)

USPC ........ 280/728.1; 442/187; 442/200; 428/36.1

(58) Field of Classification Search
USPC ............ 280/728.1; 139/383 R; 156/314, 315; 427/207.1, 208.2, 208.4; 442/59, 64, 442/71, 101, 168, 169, 208, 215
See application file for complete search history.

(56) References Cited

U.S. PATENT DOCUMENTS 5,073,418 A * 12/1991 Thornton et al. ............ 428/34.9
5,421,378 A * 6/1995 Bowers et al. ............. 139/435.1
5,879,767 A * 3/1999 Matsushima et al. ........ 428/35.2

(Continued)

FOREIGN PATENT DOCUMENTS

DE   10 2008 004 178 A1   7/2009
EP   0458838 B1            5/1996

(Continued)

OTHER PUBLICATIONS

German Examination Report—Oct. 14, 2011.

(Continued)

*Primary Examiner* — Paul N Dickson
*Assistant Examiner* — Barry Gooden, Jr.
(74) *Attorney, Agent, or Firm* — Brinks Gilson & Lione

(57) ABSTRACT

A fabric for use in the manufacture of an inflatable air-bag, the fabric having interwoven warp fibers and weft fibers which are arranged substantially perpendicular to one another, one or more of the warp and weft fibers being at least partially coated with an adhesive substance to increase the friction between the warp and weft fibers at their intersections. In another embodiment, the fabric is formed from fibers having a central core and another sheath.

15 Claims, 1 Drawing Sheet

(51) Int. Cl.
*D03D 15/10* (2006.01)
*D02G 3/36* (2006.01)

(56) References Cited

U.S. PATENT DOCUMENTS

| | | | |
|---|---|---|---|
| 6,381,870 B1 * | 5/2002 | Kohlman et al. | 34/311 |
| 6,395,338 B1 * | 5/2002 | Benayoun et al. | 427/387 |
| 6,770,578 B2 * | 8/2004 | Veiga | 442/164 |
| 6,846,004 B2 * | 1/2005 | Parker | 280/728.1 |
| 7,300,691 B2 * | 11/2007 | Callaway et al. | 428/86 |
| 7,468,334 B2 * | 12/2008 | Schindzielorz | 442/164 |
| 7,557,052 B2 * | 7/2009 | Konishi et al. | 442/148 |
| 7,737,058 B2 * | 6/2010 | Keshavaraj et al. | 442/226 |
| 7,803,724 B2 * | 9/2010 | Ting et al. | 442/16 |
| 7,951,437 B2 | 5/2011 | Keshavaraj et al. | |
| 7,985,702 B2 | 7/2011 | Kano et al. | |
| 8,118,324 B2 | 2/2012 | Sollars, Jr. | |
| 8,142,869 B2 * | 3/2012 | Kobayashi et al. | 428/36.1 |
| 8,257,797 B2 * | 9/2012 | Dumont et al. | 427/387 |
| 8,313,837 B2 * | 11/2012 | Stine et al. | 428/423.1 |
| 8,669,194 B2 * | 3/2014 | Kismir et al. | 442/215 |
| 8,733,788 B2 | 5/2014 | Finn et al. | |
| 2002/0017779 A1 * | 2/2002 | Gilpatrick et al. | 280/743.1 |
| 2002/0114891 A1 * | 8/2002 | Benayoun et al. | 427/387 |
| 2003/0060104 A1 * | 3/2003 | Veiga | 442/76 |
| 2003/0104162 A1 * | 6/2003 | Hoyt et al. | 428/85 |
| 2004/0147186 A1 * | 7/2004 | Konishi et al. | 442/76 |
| 2005/0003722 A1 * | 1/2005 | James et al. | 442/76 |
| 2006/0143767 A1 * | 7/2006 | Yang et al. | 2/16 |
| 2006/0217018 A1 * | 9/2006 | Parker | 442/59 |
| 2006/0284403 A1 | 12/2006 | Hill | |
| 2007/0166495 A1 * | 7/2007 | Sellis et al. | 428/36.1 |
| 2007/0278775 A1 * | 12/2007 | Ting et al. | 280/743.1 |
| 2008/0075903 A1 * | 3/2008 | Keshavaraj et al. | 428/36.1 |
| 2008/0178986 A1 * | 7/2008 | Siavoshani et al. | 156/73.1 |
| 2008/0182471 A1 * | 7/2008 | Danzey | 442/199 |
| 2009/0298367 A1 * | 12/2009 | Lafaysse et al. | 442/59 |
| 2010/0040792 A1 * | 2/2010 | Keshavaraj et al. | 427/393.3 |
| 2010/0129575 A1 | 5/2010 | Veiga | |
| 2010/0159189 A1 | 6/2010 | Takagi et al. | |
| 2010/0190396 A1 * | 7/2010 | Nozoe et al. | 442/59 |
| 2010/0295283 A1 * | 11/2010 | Yamada et al. | 280/743.1 |
| 2011/0203732 A1 * | 8/2011 | Keshavaraj et al. | 156/331.7 |
| 2011/0210532 A1 * | 9/2011 | Johansson | 280/728.1 |
| 2012/0244333 A1 * | 9/2012 | Aksay et al. | 428/221 |
| 2013/0020791 A1 | 1/2013 | Yamamoto et al. | |

FOREIGN PATENT DOCUMENTS

| | | |
|---|---|---|
| EP | 1475475 B1 | 6/2008 |
| GB | 1463969 | 2/1977 |
| GB | 2 376 959 A | 12/2002 |
| JP | 2002-363835 | 12/2002 |
| WO | 9009295 | 8/1990 |
| WO | 01/34435 A1 | 5/2001 |
| WO | 2010/027228 A2 | 3/2010 |

OTHER PUBLICATIONS

PCT International Search Report—Sep. 20, 2012.
PCT International Search Report; Jul. 11, 2011.
European Examination Report; Aug. 18, 2010.

* cited by examiner

FABRIC FOR USE IN THE MANUFACTURE OF AN INFLATABLE AIR-BAG

CROSS-REFERENCE TO RELATED APPLICATION

This application claims priority to European Patent Application No. 11158547.0, filed Mar. 16, 2011 and PCT/SE2012/050210, filed Mar. 9, 2012.

FIELD OF THE INVENTION

This invention relates to a fabric for use in the manufacture of an inflatable air-bag, and a method of making the fabric.

BACKGROUND

Inflatable air-bags, for use in occupant constraint systems in motor vehicles, are conventionally formed from woven fabrics. These fabrics typically comprise two sets of fibres, known as warp and weft fibres, which are interwoven with one another and arranged approximately at right angles to one another. A coating is often applied to such fabrics, and the coating provides the function of decreasing the permeability of the material, and maintaining the fibres in their intended positions.

It is advantageous to reduce the weight of an air-bag as much as possible. This will not only reduce the quantity of material required to construct the air-bag, thereby reducing the cost of the finished item, but will also reduce the weight that must be transported by a vehicle which contains the air-bag.

Focusing on the fabric of an air-bag, there are two principal options for reducing the weight of the air-bag. One is to reduce the weight per unit length of the fibres used to form the fabric (conventionally measured in tex (1 tex=1 gram per km) or decitex). The other is to reduce the density of fibres per unit area of the fabric (conventionally measured in sett, i.e. threads per cm, counted in as the number of perpendicular threads that are encountered along the length of one of the warp or weft fibres).

If fibres having reduced decitex are used, it is found that the tear and tensile strengths of the fabric are both reduced. This is the case even if the number of threads per unit area is increased to compensate, as each individual thread will break relatively easily.

If the spacing between the fibres is increased, two undesirable effects typically result. The first is that there are larger gaps between the fibres. If the fabric is not coated, then this will increase the permeability of the fabric. If the fabric is covered with a coating, then the coating material will come under greater stress in the larger regions between the fibres when the pressure difference across the fabric is high. Clearly, this leads to an increased risk of rupturing of the coating material.

Secondly, as the sett is reduced, the wrapping angle of each fibre around adjacent fibres is reduced. This reduces the inter-fibre friction, which is fundamental to the formation of the stable fabric. In addition, as stress is applied to the fabric, individual fibres can slide laterally with respect to adjacent fibres, a phenomenon known as combing. For an uncoated fabric, once again this will increase the permeability of the material. For a coated fabric, this combing movement places additional stress on the coating, which will generally lead to micro-ruptures at the elongated interstices.

SUMMARY

Accordingly, one aspect of the present invention provides a fabric for use in the manufacture of an inflatable air-bag, the fabric comprising interwoven warp fibres and weft fibres which are arranged substantially perpendicular to one another, one or more of the warp and weft fibres being at least partially coated with an adhesive substance to increase the friction between the warp and weft fibres at their intersections.

Advantageously, both the warp and weft fibres are at least partially coated with an adhesive substance.

Preferably, the adhesive is a two-component adhesive, with the warp fibres being at least partially coated with a first component of the adhesive, and the weft fibres being at least partially coated with a second component of the adhesive.

Conveniently, the adhesive is an adhesive that may be activated, to increase its adhesive properties, after being applied to the one or more of the warp and weft fibres.

Advantageously, the coating substance displays a higher coefficient of friction, with respect to itself, than the fibres.

Another aspect of the present invention provides a fabric for use in the manufacture of an inflatable air-bag, the fabric comprising interwoven warp and weft fibres which are arranged substantially at right angles to one another, wherein each of at least one of the warp and weft fibres are formed from a core surrounded by an outer coating.

Preferably, the core is formed from a material having a higher tensile strength than the outer coating.

Conveniently, the outer coating is formed from a material having a higher coefficient to friction with respect to itself than the material from which the core is formed.

Advantageously, the fabric has a cover value below around 55%.

A further aspect of the present invention provides an air-bag formed from a fabric according to any of the above.

Another aspect of the present invention provides a method of forming a fabric for use in the manufacture of an inflatable air-bag, the method comprising the steps of: providing two sets of fibres; treating at least one of the sets of fibres at least partially coating the at least one set of fibres with an adhesive to increase the coefficient of friction between one of each of the two sets of fibres thereof; and weaving the sets of fibres together to form a fabric, so that the two sets of fibres form warp and weft fibres of the fabric and are arranged substantially at right angles to one another.

Preferably, the method comprises the step of at least partially coating both sets of fibres with an adhesive.

Conveniently, the adhesive is a two-component adhesive, one of the sets of fibres being at least partially coated with a first component of the adhesive, and the other of the set of fibres being at least partially coated with a second component of the adhesive.

Advantageously, the adhesive is an adhesive that may be activated, to increase its adhesive properties, after being applied to the one or more of the warp and weft fibres, and the method further comprises the step of activating the adhesive after the step of weaving the sets of fibres together to form a fabric.

A further aspect of the present invention provides a method of forming a fabric for use in the manufacture of an inflatable air-bag, comprising the steps of: forming at least one set of fibres from a core covered by an outer coating; and interweaving the fibres with further fibres to form a fabric, wherein the fibres and further fibres comprise warp and weft fibres of the fabric and are arranged substantially at right angles to each other.

Preferably, the core is formed from a material which has a higher tensile strength than the material of the coating.

Conveniently, the outer coating is formed from a material having a higher coefficient of friction, with respect to itself, than the material from which the core is formed.

A further aspect of the present invention provides a method of manufacturing an air-bag, comprising the steps of: forming a fabric in accordance with the above; and manufacturing the air-bag from the fabric.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION

Figure 1:
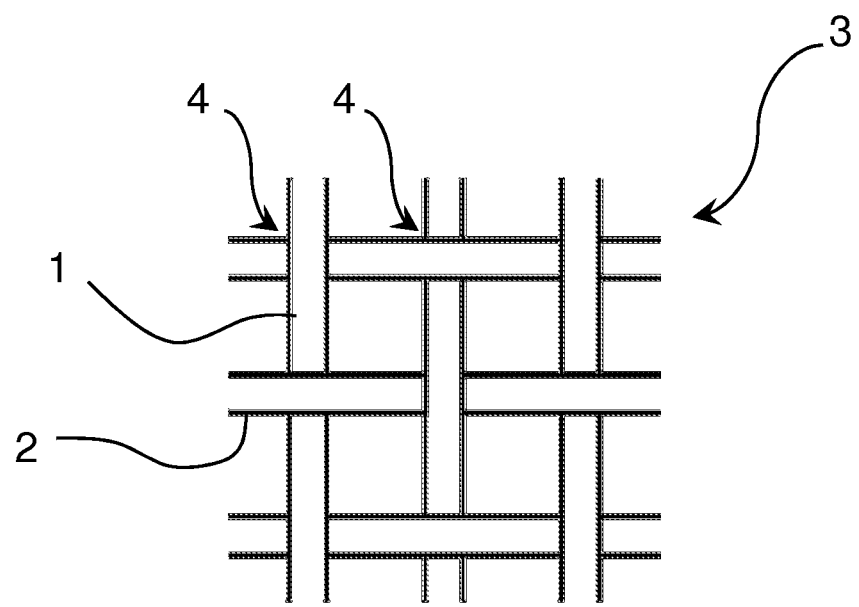
FIG. 1 shows a fabric embodying the present invention.

Referring to FIG. 1, a close-up view of warp and weft fibres 1,2 making up a fabric 3 for use in the manufacture of an inflatable air-bag is shown. Each warp fibre 1 passes alternately under and over weft fibres 2 that are encountered along its length. Similarly, each weft fibre 2 passes alternately under and over warp fibres 1 that are encountered along its length.

In the embodiments shown in FIG. 1, both the warp and weft fibres 1,2 are at least partially coated with an adhesive substance, to increase the friction between the warp and weft fibres 1,2 in the woven fabric 3. It will be understood that the resulting increase in friction at the intersections 4 between the warp and weft fibres 1,2 will prevent relative movement of the fibres 1,2 with respect to one another, thus increasing the stability and overall strength and reliability of the fabric 3.

In embodiments of the invention, the warp and weft fibres 1 may be entirely or substantially entirely coated with adhesive. In alternative embodiments, the fibres 1,2 may be partially coated. In yet further embodiments, only the warp fibres 1, or alternatively only the weft fibres 2, may be coated with adhesive.

In yet further embodiments, a two-component adhesive may be used, the warp fibres 1 being at least partially coated with a first component of the adhesive, and the weft fibres 2 being at least partially coated with a second component of the adhesive. This will ensure that the warp and weft fibres 1,2 are individually relatively easy to handle and work with prior to and during weaving of the fabric 3, but once the warp and weft fibres 1,2 come into contact with one another, the two components of the adhesive will react with one another forming a bond between the warp and weft fibres 1,2.

In other embodiments, an adhesive substance may be used whose adhesive/frictional properties can be enhanced after application by an activation process. For instance, a heat-activated adhesive may be used, which initially has relatively low adhesive properties, but after being heated above a threshold temperature becomes significantly more adhesive. Adhesives that are activated by contact with another substance (such as water), or by mechanical means such as the application of pressure, are also envisaged.

In these embodiments either or both of the warp and weft fibres 1,2 may be at least partially coated with an activatable adhesive substance, and the fabric 3 is preferably woven before the substance is activated, to ensure that the warp and weft fibres 1,2 are individually relatively easy to handle and work with prior to and during weaving of the fabric 3. Once the fabric 3 has been woven, the adhesive substance is then activated in the appropriate way.

Figure 2:
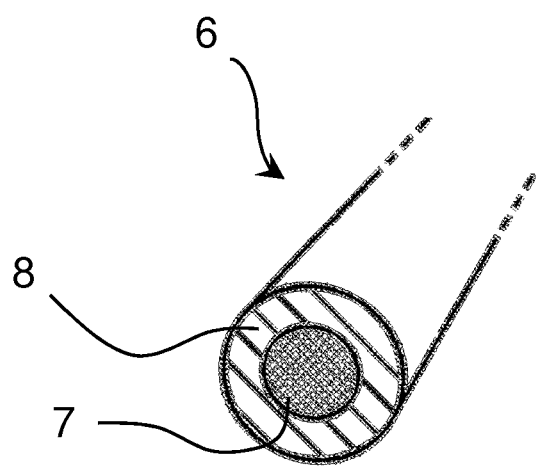
FIG. 2 shows a fibre which may be used in the manufacture of fabrics embodying the present invention.

In further embodiments of the invention, each fibre may be formed from two separate fibre components. For instance, as shown in FIG. 2, each fibre 6 may comprise a core 7 formed from a strong, relatively low-friction material such as high-tension nylon, and an outer coating 8 formed from a material having a lower strength but a higher friction coefficient with respect to itself, (i.e. a higher coefficient of friction between two surfaces which are both formed from that material) such as polypropylene. If the fibre 6 was made entirely from either of these two materials, the fibre 6 would either be unacceptably weak, or would, when woven into a fabric, be overly susceptible to slippage with respect to adjacent fibres. The formation of a fibre having a strong core with a high-friction coating leads to an advantageous combination of strength and resistance to fibre slippage in a woven fabric.

It will be understood that all of the above techniques increase the friction between warp and weft fibres where these fibres meet in a woven fabric. This will provide resistance to slippage of the fibres with respect to one another, increasing the stability and reliability of the resulting fabric. If the fabric is uncoated, the permeability of the fabric will remain low when high forces are exerted on the fabric. If the fabric is coated, slippage of the fibres within the coating will be reduced, therefore helping maintain the regular sizes of the interstitial spaces and hence the integrity of the coating under large forces.

The relationship between the amount of material comprising fibres, and the spaces therebetween, in a unit area can be calculated, and the result is known as the "cover factor". The cover factor allows fabrics made with different decitex fibres to be compared, and is also a useful way of describing a fabric without specifying a particular decitex value.

In preferred embodiments of the invention the fabric have a cover value of 55% or lower, and preferably below 54%. These values are lower than those found in conventional air-bag fabrics, but using techniques described above robust and versatile fabrics having such cover values are possible.

In this specification the term "adhesive" may take its normal meaning, i.e. a substance that forms a chemical bond between two surfaces.

While the above description constitutes the preferred embodiment of the present invention, it will be appreciated that the invention is susceptible to modification, variation and change without departing from the proper scope and fair meaning of the accompanying claims.

The invention claimed is:

1. A fabric for use in the manufacture of an inflatable air-bag, the fabric comprising interwoven warp fibres and the weft fibres which are arranged substantially perpendicular to one another, the warp and weft fibres being at least partially coated with an adhesive substance prior to interweaving to increase friction between the warp and the weft fibres at their intersections, the warp fibres being at least partially coated with a first component of the adhesive substance, and the weft fibres being at least partially coated with a second component of the adhesive substance.

2. The fabric according to claim 1, wherein the adhesive substance displays a higher coefficient of friction, with respect to itself, than the fibres.

3. The fabric according to claim 1 having a cover value of at most 55%.

4. An air-bag formed from the fabric according to claim 1.

5. The fabric according to claim 1 wherein the adhesive is an adhesive that may be activated, to increase its adhesive properties, after being applied to the warp and the weft fibres.

6. A fabric for use in the manufacture of an inflatable air-bag, the fabric comprising interwoven warp and weft fibres which are arranged substantially at right angles to one another, wherein each of the warp and the weft fibres are formed from a core surrounded by an outer coating with a higher coefficient of friction than the core, and the core is formed from a material having a higher tensile strength than the outer coating, the warp fibres being at least partially coated with a first component of an adhesive, and the weft fibres being at least partially coated with a second component of the adhesive.

7. The fabric according to claim 6, wherein the outer coating is formed from a material having a higher coefficient to friction with respect to itself than the material from which the core is formed.

8. The fabric according to claim 6 having a cover value of at most 55%.

9. An air-bag formed from the fabric according to claim 6.

10. A method of forming a fabric for use in the manufacture of an inflatable air-bag, the method comprising the steps of:
   providing two sets of fibres;
   treating the two sets of fibres by at least partially coating at least one set of fibres with an adhesive to increase a coefficient of friction between the two sets of fibres, a first of the two sets of fibres being at least partially coated with a first component of the adhesive, and a second of the two sets of fibres being at least partially coated with a second component of the adhesive; and
   subsequently weaving the two sets of fibres together to form a fabric, so that the first of the two sets of fibres forms warp fibres and the second of the two sets of fibres forms weft fibres of the fabric and the warp and weft fibres are arranged substantially at right angles to one another.

11. The method of manufacturing an air-bag, comprising the steps of:
   forming a fabric in accordance with claim 9 and manufacturing the air-bag from the fabric.

12. The method according to claim 10 wherein the adhesive is an adhesive that may be activated, to increase its adhesive properties, after being applied to the one or more of the warp and weft fibres, and the method further comprises the step of activating the adhesive after the step of weaving the sets of fibres together to form a fabric.

13. A method of forming a fabric for use in the manufacture of an inflatable air-bag, comprising the steps of:
   forming two sets of fibres from a core covered by an outer coating with a higher coefficient of friction than the core; and
   interweaving the fibres with further fibres to form a fabric, wherein the fibres and the further fibres comprise warp and weft fibres of the fabric and are arranged substantially at right angles to each other;
   the warp fibres being at least partially coated with a first component of an adhesive, and the weft fibres being at least partially coated with a second component of the adhesive.

14. The method according to claim 13, wherein the core is formed from a material which has a higher tensile strength than the material of the coating.

15. The method according to claim 13, wherein the outer coating is formed from a material having a higher coefficient of friction, with respect to itself, than the material from which the core is formed.

* * * * *